United States Patent
Doerr et al.

(10) Patent No.: US 8,548,688 B2
(45) Date of Patent: Oct. 1, 2013

(54) METHOD AND CONTROL DEVICE FOR TRIGGERING PASSENGER PROTECTION MEANS FOR A VEHICLE

(75) Inventors: Alfons Doerr, Stuttgart (DE); Holger Denz, Gerlingen (DE); Marcel Maur, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 565 days.

(21) Appl. No.: 12/867,641

(22) PCT Filed: Dec. 1, 2008

(86) PCT No.: PCT/EP2008/066544
§ 371 (c)(1),
(2), (4) Date: Oct. 29, 2010

(87) PCT Pub. No.: WO2009/103374
PCT Pub. Date: Aug. 27, 2009

(65) Prior Publication Data
US 2011/0040453 A1  Feb. 17, 2011

(30) Foreign Application Priority Data
Feb. 22, 2008 (DE) .......................... 10 2008 010 560

(51) Int. Cl.
*B60R 21/0132* (2006.01)
(52) U.S. Cl.
USPC ............ 701/45; 280/734; 280/735; 180/282; 340/440
(58) Field of Classification Search
CPC .......... B60R 2021/01327; B60R 2021/01325; B60R 2021/0018
USPC ....................................................... 701/45, 80
See application file for complete search history.

(56) References Cited

U.S. PATENT DOCUMENTS

| | | | |
|---|---|---|---|
| 2002/0189883 A1* | 12/2002 | Lahmann et al. | 180/282 |
| 2003/0182042 A1* | 9/2003 | Watson et al. | 701/45 |
| 2004/0176889 A1* | 9/2004 | Capito | 701/37 |
| 2005/0234628 A1* | 10/2005 | Luders et al. | 701/80 |
| 2006/0036360 A1* | 2/2006 | Schubert et al. | 701/70 |
| 2009/0143944 A1* | 6/2009 | Park | 701/45 |
| 2009/0150021 A1* | 6/2009 | Le et al. | 701/29 |
| 2009/0164060 A1* | 6/2009 | Fortson et al. | 701/35 |
| 2009/0306859 A1 | 12/2009 | Tichy et al. | |
| 2010/0042294 A1* | 2/2010 | Lich et al. | 701/41 |

FOREIGN PATENT DOCUMENTS

DE  102006018029  10/2007

OTHER PUBLICATIONS

International Search Report, PCT International Patent Application No. PCT/EP2008/066544, dated Mar. 17, 2009.

* cited by examiner

*Primary Examiner* — Khoi Tran
*Assistant Examiner* — Ryan Rink
(74) *Attorney, Agent, or Firm* — Kenyon & Kenyon LLP

(57) ABSTRACT

A method and a control device for triggering passenger protection devices for a vehicle are provided, a rollover event causing the triggering of the passenger protection devices. The rollover event is detected as a function of kinematic and rotation variables, an adhesion, and a static stability factor. A state of rotation is ascertained via a rotation rate and a rotation angle. A state of adhesion is ascertained from a vehicle transverse acceleration and a vehicle vertical acceleration. The rollover event is detected via the state of adhesion and the state of rotation, the adhesion being much greater than the static stability factor.

10 Claims, 2 Drawing Sheets

METHOD AND CONTROL DEVICE FOR TRIGGERING PASSENGER PROTECTION MEANS FOR A VEHICLE

FIELD OF THE INVENTION

The present invention relates to a method and a control device for triggering passenger protection devices.

BACKGROUND INFORMATION

A device and a method for triggering a passenger protection device is described in German Patent Application No. DE 10 2006 018 029 A1, wherein a rollover event causes the triggering of the passenger protection device. This rollover event is ascertained as a function of an adhesion coefficient and a stability factor.

SUMMARY

An example method and example control device according to the present invention for triggering a passenger protection device may have the advantage that the rollover event is detected by linking the state of rotation, which is ascertained from the roll rate and the roll angle, and the state of adhesion, which is ascertained from the vehicle transverse acceleration and the vehicle vertical acceleration. The adhesion is much greater than the static stability factor. It is thus possible to avoid a so-called driving dynamics monitor, for example. In particular, the present invention is suitable for detecting rollover events in the lower roll-angle range of below 10 degrees. According to the present invention, it is not necessary for the current vehicle dynamics to be analyzed on the basis of sensor data that are typical of a driving dynamics system (ESP). Rather, an evaluation of the current driving dynamics state takes place indirectly, via the acting forces and torques alone. Thus, the present invention simplifies the detection of such rollover events while simultaneously increasing the reliability of the rollover detection.

In the case at hand, a control device is an electric device that processes sensor signals and outputs corresponding control signals. Normally, the present control device has its own housing, made up of metal and/or plastic, for example.

In the present case, triggering refers to the activation of a passenger protection device, which in the present case is designed as a passive passenger protection device, like an airbag, belt tightener, etc.

Kinematic and rotation variables refer to accelerations and the roll rate as well as the roll angle in this instance.

In the case at hand, the adhesion, which is also known as coefficient of friction, is ascertained from the vehicle transverse acceleration and the vehicle vertical acceleration, as described in a dependent claim.

The static stability factor, normally abbreviated by SSF, is a calculation value that indicates the resistance against a rollover event. Thus, geometric properties of the vehicle are used to calculate it. The static stability factor may be seen as an index for the top-heaviness of a vehicle. The stability factor may be ascertained from a vehicle width and the height of the center of gravity, for example. For example, the width is provided by the distance between the right and left tires, which are disposed on an axle. The center of gravity is normally ascertained in the laboratory, the lower the static stability factor, the greater the probability that the vehicle will roll over in a crash.

The roll rate is the rate of rotation around the vehicle longitudinal axis, a vehicle, when it rolls over, most frequently rolling over around this vehicle longitudinal axis. The roll angle is the integrated roll rate, it also being possible to measure the roll angle directly. There are also rotational acceleration sensors that may be used to ascertain the roll rate and the roll angle through corresponding integration. The term "integration" is meant pragmatically, and it involves an integration that is common in computing. These two parameters, to wit, the roll rate and the roll angle, characterize the state of rotation using this pair of values.

In contrast, the state of adhesion is defined by the pair of values made up of vehicle transverse acceleration and vehicle vertical acceleration. This is then used to ascertain the adhesion in the lateral vehicle direction. The state of adhesion is thus either equal to the adhesion or a variable directly derived from the adhesion.

As a secondary condition, according to an example embodiment of the present invention, the adhesion should be much greater than the static stability factor in order to use the method according to the present invention in an advantageous manner.

The interface may be designed as hardware and/or software. In particular, it may be distributed in order to provide the different sensor signals, to wit, the vehicle transverse acceleration and the vehicle vertical acceleration, as well as the roll rate and the roll angle. As specified above, the roll angle may be measured or calculated. This is also true of the roll rate.

The evaluation circuit may be a processor such as a microcontroller or another processor type. In particular, multicore processor types are also possible. However, the evaluation circuit may also be a corresponding hardware circuit that is configured for a specific purpose, as an integrated circuit, for example. An at least partially discrete implementation is also possible in the case at hand. The state of adhesion module, the state of rotation module, the fusion module, the triggering module, and the classification module from the dependent claim are correspondingly designed as hardware and/or software. That is, on a microcontroller, these modules may be software modules. However, if the evaluation circuit is designed as a pure hardware circuit, they may be circuit sections.

The triggering circuit is a circuit block normally separated from the evaluation circuit, and is also designed as an integrated circuit, as part of a system ASIC that contains different functions of the control device, for example. The triggering circuit has electrically controllable power switches that release an ignition current for an ignition element for an airbag in a triggering case, for example.

It is advantageous if the adhesion is ascertained as a function of a division of the vehicle transverse acceleration by the vehicle vertical acceleration. This may be supplemented by corresponding correcting, factors, or summands, which then refine the result. This characterizes the adhesion in the vehicle transverse direction, which is to be considered particularly important for the existing rollover. As an alternative to the division, approximation expressions are also possible, in which no division is provided.

It is furthermore advantageous if the state of rotation and the state of adhesion are respectively divided into at least three classes. The rollover event is ascertained as a function of these classifications. Thus, the classifications are fused into a total classification. The classification module specified according to the present invention may be used for this purpose.

As specified above already, the example method is preferably used for a roll angle of less than 15 degrees. That is, if the roll angle is greater, other methods may be used.

It is furthermore advantageous if at least three ranges are predefined for a pair of values made up of the roll rate and the roll angle. A first range includes first pairs of values, which indicate the rollover event independently of the vehicle transverse acceleration, the vehicle vertical acceleration (the currently active forces in the lateral and vertical direction) and the torques. That is, this first range describes events that will definitely result in a rollover event. Then there is no turning back. A second range includes second pairs of values that do not indicate a rollover event. That is, in this range, there will be no rollover event at all. The third range, which includes third pairs of values, indicates a rollover event only if the state of rotation and the state of adhesion cause the rollover event in the totality. The threshold between the second and the third range may be ascertained as a function of static vehicle variables, the vehicle vertical acceleration, the roll angle, and the adhesion.

Additionally, it is advantageous if the static vehicle variables are the static stability factor, the vehicle mass, the center-of-gravity height in the idle state, and a moment of inertia in the roll direction.

The roll rate sensor system and the acceleration sensor system for the detection of the vehicle transverse acceleration and the vertical acceleration may be advantageously installed in the control device.

BRIEF DESCRIPTION OF THE DRAWINGS

Exemplary embodiments of the present invention are illustrated in the figures and are explained in greater detail below.

DETAILED DESCRIPTION OF EXAMPLE EMBODIMENTS

Figure 1:
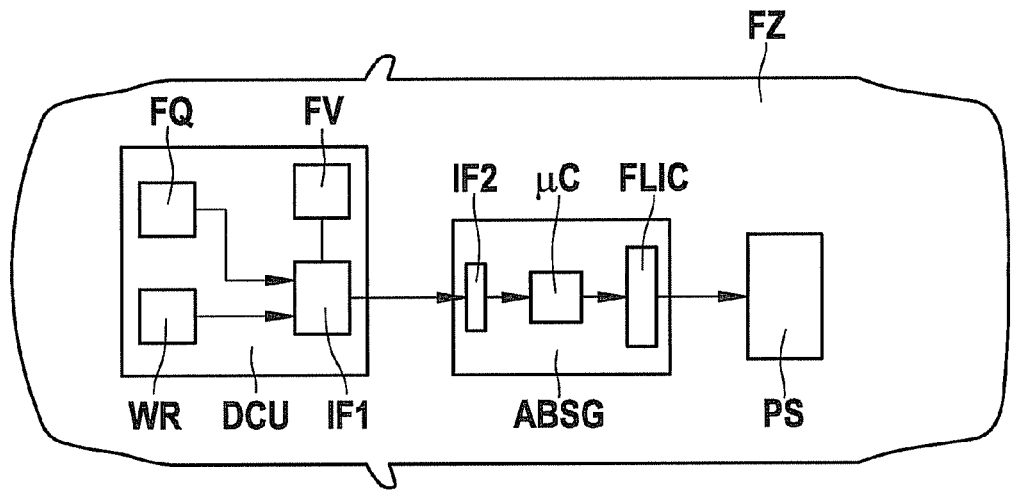
FIG. 1 shows a block diagram of the control device according to the present invention having connected components in a vehicle.

FIG. 1 illustrates a block diagram having control device ABSG according to an example embodiment of the present invention having connected components in a vehicle FZ. In the case at hand, a sensor control device DCU is connected to control device ABSG. Airbag control device ABSG is in turn connected to passenger protection devices PS, such as airbags or belt tighteners. Sensor control device DCU houses at least the sensor system necessary according to the example embodiment of the present invention, to wit, a roll rate sensor system WR, an acceleration sensor system for detecting vehicle transverse acceleration FQ, and an additional acceleration sensor system for detecting vehicle vertical acceleration FV. Additional acceleration sensors and other sensors, such as a structure-borne noise sensor and the like, may be contained in control device DCU. Alternatively, it is possible for at least parts of the acceleration sensor system to be disposed in airbag control device ABSG or also separately as peripheral sensors at different locations in vehicle FZ.

In the case at hand, the sensor data of sensors WR, FQ, and FV are transmitted via interface IF1 to airbag control device ABSG and in the process to interface IF2. The interfaces may be designed as a point-to-point connection or as a bus connection. Furthermore, a preprocessing of the sensor signals may already be provided in control device DCU. This includes, for example, the derivation of the roll angle from the roll rate by integration.

The received sensor data are transmitted from interface IF2 to the evaluation circuit, in the case at hand, a microcontroller μC, so that the example method according to the present invention may then be used on the sensor data. In the case at hand, only the components that are used for the example embodiment of the present invention are illustrated. Additional components that may be required for operating the individual control devices but that do not contribute to an understanding of the present invention have been omitted for the sake of simplicity.

The transmission from interface IF2 to evaluation circuit μC may take place, for example, via the so-called SPI (serial peripheral interface) bus. Microcontroller μC derives the roll angle from the roll rate if it is not already provided and then ascertains from the roll rate and the roll angle the state of rotation of vehicle FZ. Furthermore, microcontroller μC ascertains from the vehicle transverse acceleration and the vehicle vertical acceleration the state of adhesion of vehicle FZ in the vehicle vertical direction. The state of rotation and the state of adhesion are then classified into one of at least three classes, respectively. The states of rotation and adhesion classified in this manner are then fused, in order to detect whether or not a rollover event exists. This fusing may be implemented in different manners. For example, it is possible to predefine which combinations of classifications of the state of rotation and of the state of adhesion indicate a rollover event. However, this may be refined even further by evaluating the classifications as well, for example.

The triggering signal is generated by a triggering module as a function of the detected rollover event, and is then also transmitted via an SPI interface to triggering circuit FLIC, so that the triggering circuit triggers passenger protection device PS located outside of control device ABSG, in that an ignition current is connected to the ignition elements of the airbags to be triggered, for example. The triggering signal indicates which passenger protection devices are to be triggered for the present rollover event.

Figure 2:
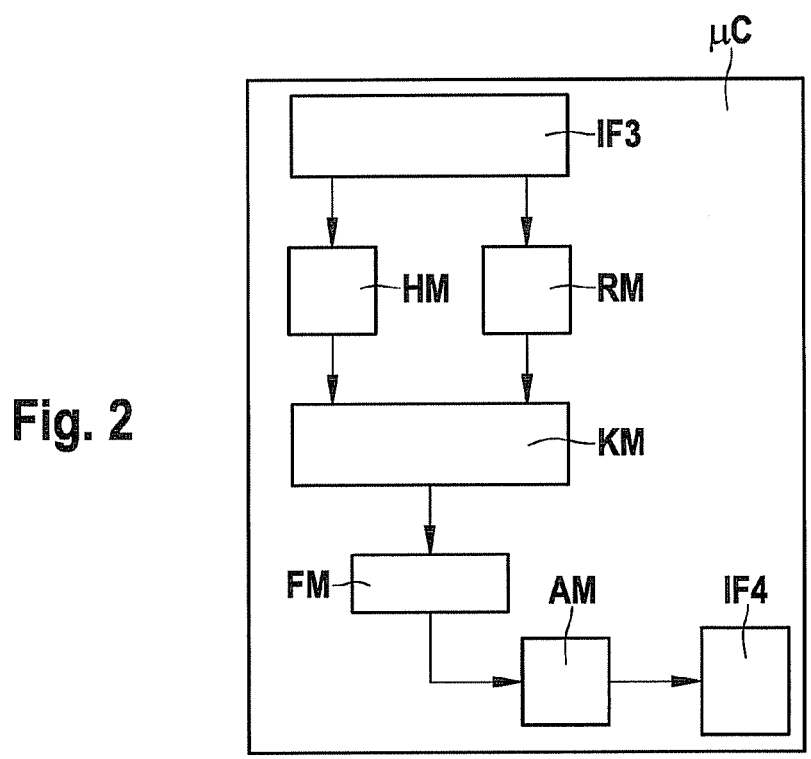
FIG. 2 shows an exemplary configuration of software modules on a microcontroller.
Figure 4:
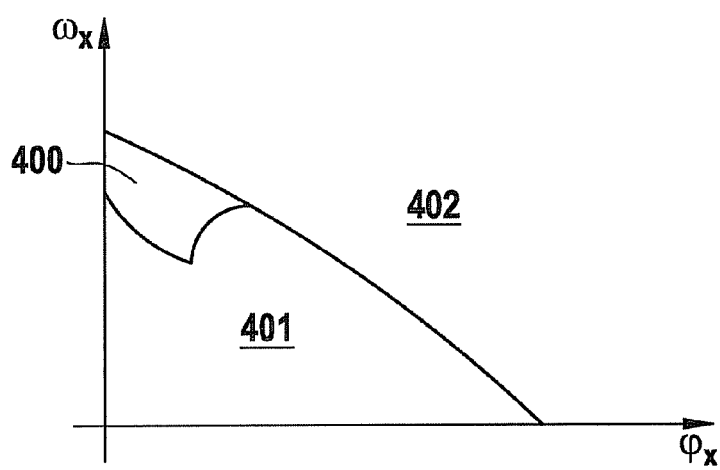
FIG. 4 shows a roll-rate roll-angle diagram.

FIG. 2 illustrates an exemplary configuration of software modules on microcontroller μC. An interface IF3 provides the necessary data for the example method according to the present invention. In addition to the roll rate and the roll angle, this includes the vehicle transverse acceleration and the vehicle vertical acceleration. Additional data that are vehicle-specific, such as the mass, the height of the vehicle center of gravity, the static stability factor, etc., are loaded from a memory. Microcontroller μC may calculate the roll angle from the roll rate in a module not illustrated. In state of adhesion module HM, the state of adhesion is ascertained from the vehicle transverse acceleration and the vehicle vertical acceleration by dividing these two variables. The ascertaining may be further refined by correction factors and correction summands. The adhesion that is thus ascertained must be much greater than the static stability factor; otherwise no rollover event exists. This comparison is accordingly carried out in adhesion module HM in the case at hand. The state of adhesion is then supplied to a classification module KM, which then categorizes the state of adhesion into one of at least three classes. The roll rate and the roll angle enter into state of rotation module RM as parameters. The diagram from FIG. 4 is used for this purpose, for example. The roll angle is plotted on the abscissa and the roll rate is plotted on the ordinate. Three ranges are provided: 400, 401, and 402, which uniquely assign the pairs of values from roll rate $\omega x$ and roll angle $\phi x$. The rollover-critical state is present in region 400, that is, this range includes pairs of values that indicate a rollover event only if the state of rotation and the state of adhesion cause the rollover event. A rollover event is always present in range 402; a consideration of the state of adhesion is no longer necessary. No rollover event exists in region 401.

The movement equation for a rotational movement about the longitudinal axle of the vehicle is provided by equations 1 through 3 in the case of a lateral vehicle movement. $J_x$ is the moment of inertia around the current point of rotation, $h_{CM}$ is the current center-of-gravity height of the vehicle, $\mu$ is the adhesion that may be assigned to the lateral vehicle movement, m is the mass of the vehicle, $\omega x$ is the roll rate, $\phi$ is the roll angle, $a_z$ is the vertical acceleration, and SSF is the static stability factor of the vehicle. The equations are as follows:

$$J_x \cdot \overline{\omega} = \overline{F} \times \overline{r} \quad \text{(Equation 1)}$$

$$\Rightarrow \dot{\omega} \cong \frac{m}{J_x} h_{CM} \cdot (\mu - SSF) \cdot a_z \quad \text{(Equation 2)}$$

$$\Rightarrow \omega_{Threshold} \cong \sqrt{\frac{2m \cdot h_{CM} \cdot (\mu - SSF) \cdot a_z \cdot \varphi}{J_x}} \quad \text{(Equation 3)}$$

A lateral vehicle speed is described implicitly in the equations. If the lateral vehicle speed exceeds a critical speed then, when certain preconditions are met, it may be assumed that a rollover-critical state of rotation of the vehicle exists when a suitably selected roll-rate threshold value curve (equation 3) is exceeded.

If the current state of rotation is in range 400 in FIG. 4, then in the event of a lateral vehicle movement, when certain preconditions are met, a vehicle roll-over may be expected. The lower limit of range 400 is also justified by movement equation 3. The prerequisite for this assumption is that the current lateral acceleration along with the current vertical acceleration cannot be attributed to a typical cornering force as long as the prerequisite for the above-mentioned physical correlation is fulfilled with certainty by $\mu$ being much greater than SSF. In the case at hand, this should be fulfilled at an adhesion of 120% of the SSF at least.

If vehicle FZ reaches a rollover-critical range 400 at any time, then an impending vehicle rollover may be assumed, independently of whether short-term states of rotation are run through in the rollover-uncritical range 401. The run-through of rollover-critical ranges (pairs of values) must be temporally stable. That is, a plurality of rollover-critical value pairs possibly have to be run through one after another before a triggering decision occurs. The temporal duration in the rollover-critical range required for a triggering decision may deviate depending on the distance from the threshold value curve.

The state of rotation is thus classified by ranges 400, 401, and 402 in classification module KM, for example. In fusion module FM, the classifications are then fused in order to ascertain whether a rollover event exists or not. This may occur in many ways. For example, it is possible to permanently assign the class combinations of the state of adhesion and of the state of rotation to the rollover event. However, all other possibilities of the fusion are possible in the case at hand. If a rollover event is ascertained, then a triggering signal is generated in triggering module AM, which is then transmitted via interface IF4, for example via the SPI bus to triggering circuit FLIC.

Figure 3:
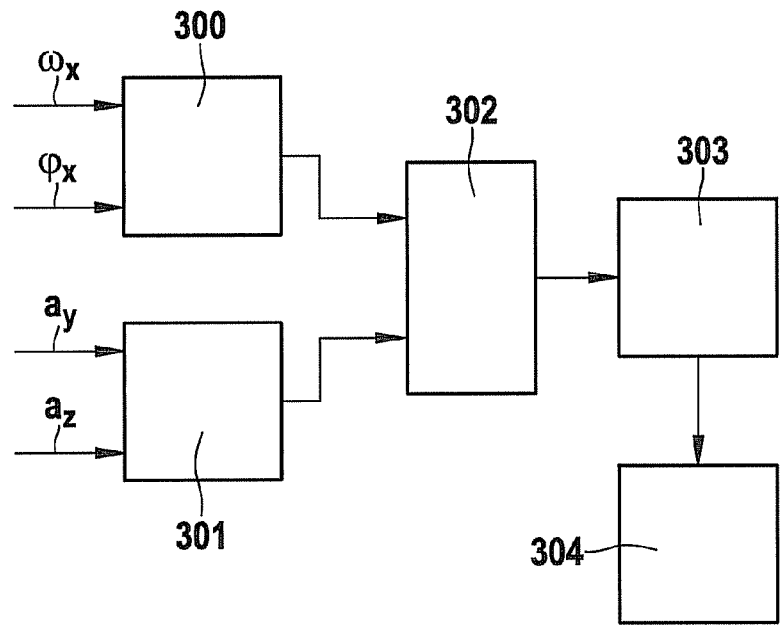
FIG. 3 shows a signal flow chart of the example method according to the present invention.

FIG. 3 shows a signal flow chart of the method according to the present invention. Roll rate $\omega x$ and roll angle $\phi x$ enter into block 300, in which an evaluation of the state of rotation is performed. This may take place by means of FIG. 4, for example. Vehicle transverse acceleration ay and vehicle vertical acceleration az enter into block 301, in which the adhesion is evaluated with regard to the lateral movement. Both the state of rotation and the state of adhesion are evaluated in block 302. A vehicle rollover is thus detected in block 303 as a result of a lateral vehicle movement. Passenger protection devices are then triggered in block 304.

What is claimed is:

1. A method for triggering a passenger protection device for a vehicle by a processor as a function of a rollover event which is detected as a function of rotation and kinematic variables of an adhesion and a static stability factor, comprising:

ascertaining, by the processor a state of rotation as a function of a roll rate and a roll angle;

ascertaining a state of adhesion as a function of a vehicle transverse acceleration and a vehicle vertical acceleration; and detecting, as a function of the state of rotation and the state of adhesion, a rollover event only if the adhesion is greater than a static stability factor;

generating a triggering signal as a function of the rollover event; and triggering the passenger protection device as a function of the triggering signal.

2. The method as recited in claim 1, wherein the state of adhesion is ascertained as the function of a division of the vehicle transverse acceleration by the vehicle vertical acceleration.

3. The method as recited in claim 1, wherein the state of rotation and the state of adhesion are respectively categorized into at least one of three classes, the rollover event being determined as a function of the respective classifications.

4. The method as recited in claim 1, wherein the method is implemented at the roll angle of <15 degrees.

5. The method as recited in claim 1, wherein for a pair of values made up of the roll rate and the roll angle, at least three ranges are predefined, a first range including first pairs of values that indicate the rollover event independently of the vehicle transverse acceleration and the vehicle vertical acceleration and independently of torques, a second range including second pairs of values that do not indicate a rollover event, a third range including third pairs of values that indicate a rollover event only if the state of rotation and the state of adhesion bring about the rollover event.

6. The method as recited in claim 5, wherein a threshold between the second and the third ranges is determined as a function of static vehicle variables, the vehicle vertical acceleration, the roll angle, and the adhesion.

7. The method as recited in claim 6, wherein the static vehicle variables are a static stability factor, a vehicle mass, a center-of-gravity height in an idle state, and a moment of inertia.

8. A control device for triggering a passenger protection device for a vehicle, comprising:

an interface that provides a vehicle transverse acceleration, a vehicle vertical acceleration, a roll rate and a roll angle;

an evaluation circuit including a state of adhesion module that ascertains a state of adhesion as a function of the vehicle transverse acceleration and the vehicle vertical acceleration, a state of rotation module that ascertains a state of rotation as a function of the roll rate and the roll angle, a fusion module that, as a function of the state of adhesion mad of the state of rotation, detects a rollover event only if an adhesion is greater than a static stability factor, and a triggering module that generates a triggering signal as a function of the rollover event; and a triggering circuit that triggers the passenger protection device as a function of the triggering signal.

9. The control device as recited in claim 8, wherein the triggering circuit includes a classification module which classifies the state of adhesion and the state of rotation for the fusion module respectively into one of at least three classes.

10. The control unit as recited in claim 8, wherein a roll rate sensor system, a vehicle transverse acceleration sensor system, and a vehicle vertical acceleration sensor system are disposed in the control device.

* * * * *

UNITED STATES PATENT AND TRADEMARK OFFICE
CERTIFICATE OF CORRECTION

PATENT NO. : 8,548,688 B2  Page 1 of 1
APPLICATION NO. : 12/867641
DATED : October 1, 2013
INVENTOR(S) : Doerr et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 632 days.

Signed and Sealed this

Fifteenth Day of September, 2015

Michelle K. Lee
*Director of the United States Patent and Trademark Office*